United States Patent [19]

Maurice

[11] Patent Number: 4,576,325
[45] Date of Patent: Mar. 18, 1986

[54] METHOD OF MANUFACTURING A BICYCLE HUB

[75] Inventor: Walter F. Maurice, San Luis Potosi, Mexico

[73] Assignee: Allied Corporation, Morristown, N.J.

[21] Appl. No.: 706,815

[22] Filed: Feb. 28, 1985

[51] Int. Cl.⁴ ............................................ B23P 11/00
[52] U.S. Cl. ..................... 228/135; 188/26; 228/168; 29/159.3; 29/525
[58] Field of Search ................... 29/148.4 A, 148.4 C, 29/525, 159.3; 228/135, 136, 168; 188/26

[56] References Cited

U.S. PATENT DOCUMENTS

| | | | |
|---|---|---|---|
| 2,017,154 | 10/1935 | Larkin | 29/525 X |
| 2,364,109 | 12/1944 | Taylor | 228/135 X |
| 2,798,771 | 7/1957 | Douglas | 29/159.3 |
| 3,052,955 | 9/1962 | McAndrews et al. | 29/525 X |
| 4,089,540 | 5/1978 | Liljequist | 29/525 X |
| 4,150,468 | 4/1979 | Harbottle | 29/148.4 C |
| 4,226,310 | 10/1980 | Ozaki | 188/26 X |

Primary Examiner—Kenneth J. Ramsey
Attorney, Agent, or Firm—Leo H. McCormick, Jr.; Ken C. Decker

[57] ABSTRACT

A method of manufacturing a hub member (50) for use in a coaster brake (52). A supply of tubular stock material (8) is transported to a work station and the interior thereof machined to establish first and second diameters (16) and (17), respectively, separated by a shoulder (15). A cylindrical member (10) is cut from the stock (8) and placed in a fixture (36). A disc or ring member (30) has a peripheral surface with a serrated section (32) separated from a shoulder (33) by a groove (35). The disc or ring member (30) is placed on a second fixture (38) and brought into alignment with diameter (16) of the cylindrical member (10). A ring of brazing material (37) is placed in groove (35). A force is applied to move disc member (30) into the diameter (16) of the cylindrical member (10). The serrated surface (32) on disc or ring member (30) engages diameter (17) to distort material therein and establish a mechanical joint (44). The force continues to move the second fixture (38) toward the first fixture (36) until face (42) on shoulder (33) of the disc or ring member (30) engages shoulder (15) on cylindrical member (10). Thereafter, the cylindrical member (10) with disc or ring member (30) insert is transported to an oven and heated sufficiently to flow the brazing material (37) into joint (44) to establish a brazed joint for the hub member (50).

5 Claims, 6 Drawing Figures

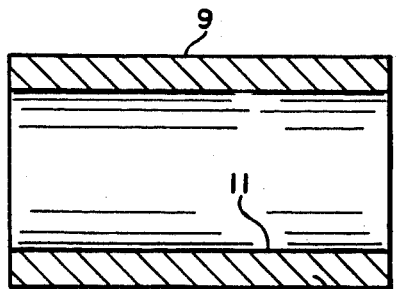
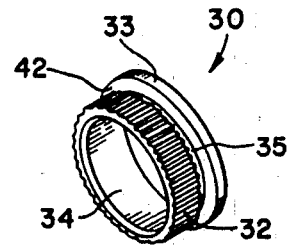
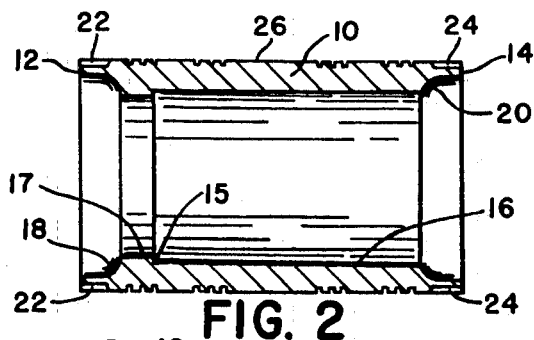
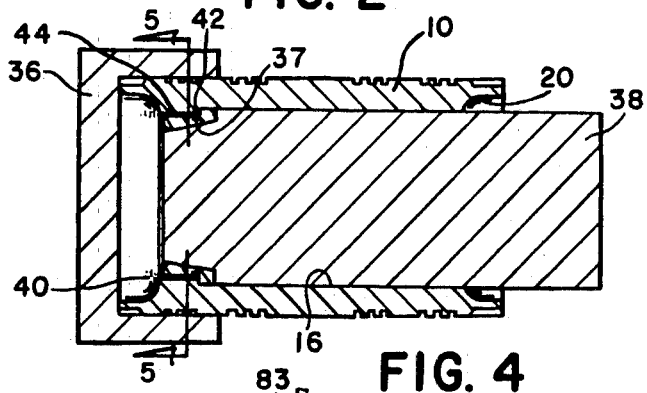
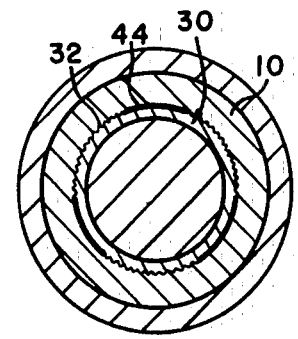
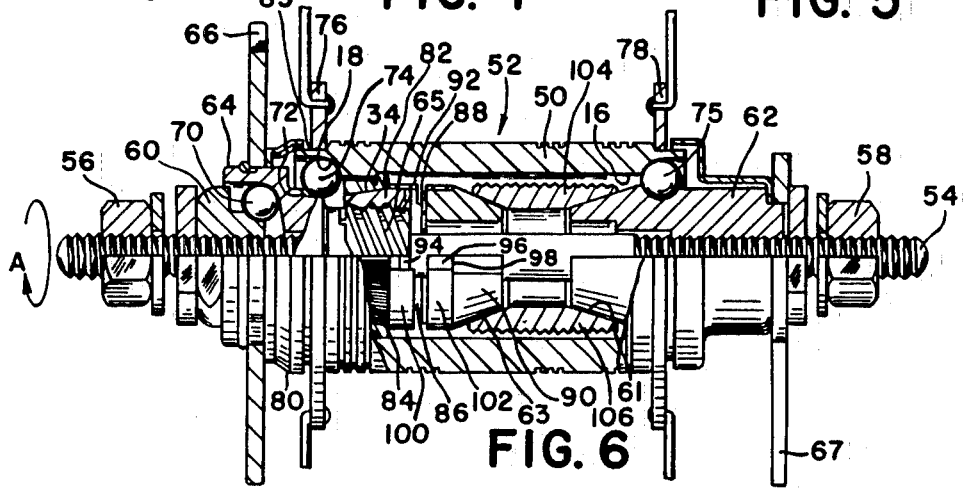

METHOD OF MANUFACTURING A BICYCLE HUB

This invention relates to a method of manufacturing a hub for a coaster brake for a bicycle.

Hubs for coaster brakes, such as disclosed in U.S. Pat. No. 3,252,551, have been made from a solid steel bar, from castings, and from cold formed blanks. Such hubs required various machining operations to establish bearing races, a tapered clutch surface, and brake surface. The tapered clutch face, which normally is located adjacent a bearing race, is matched with a corresponding surface on a brake actuating nut. The machining of the tapered clutch and brake surfaces results in a substantial waste of material and can require costly quality control procedures to assure that all components therein are within set tolerances.

The invention disclosed herein provides for the manufacture of a hub through the attachment of a disc or ring member to a machined tube. In this method of manufacture, a steel pipe or tube from a supply source is machined to establish definite inside and outside surface dimensions with a shoulder established on the inside surface between first and second diameters located thereon. A cylindrical member is cut from this supply source to definite linear dimensions. A stamped or cast disc or ring member has a peripherial surface with a groove located between a shoulder and serrated section and an inner surface with a taper therein. The cylindrical member with the bearing races therein is placed in a first fixture. The disc or ring member is placed on a second fixture. A length of brazing material in wire form is placed in the groove of the disc or ring member. The first and second fixtures are moved such that the second diameter on the inside surface of the cylindrical member and shoulder diameter of the disc member are in axial alignment. The first fixture is held in a stationary position while a force is applied to move the second fixture toward the first fixture. The ring or disc member is inserted into the second diameter of the cylindrical member. The serrated surface on the disc member engages the first diameter on the inside surface of cylindrical body to broach material therefrom. The engagement of the serrated surface establishes a connection or mechanical joint. The first fixture is moved toward the second fixture until the shoulder on the ring or disc member engages the shoulder on the cylindrical member. Any chips that are produced from the broaching operation are removed from the interior of the cylindrical member. The cylindrical member is then transported to a station where the cylindrical and disc members are heated. Such heating causes the brazing ring to flow into the mechanical joint and braze the parts together to thereby assure that the linear position of the disc or ring member remains fixed within the cylindrical member and that prevents relative rotative movement between the disc member and cylindrical member. The fixing of the disc within the hub assures that the operation of the clutch and brake within the hub is the same after repeated brake applications. The hub is then transported to a station where it is heat treated to case harden the steel.

An advantage of this method of manufacturing a hub for a coaster brake results in the saving of material since inexpensive tubular material can be used for the manufacturing stock.

A further advantage occurs through an increase in the hoop strength of a hub to prevent bursting when subjected to high clutch engagement forces.

It is an object of this invention to provide a hub for a coaster brake having a clutch positioning disc member joined to a tubular member through the engagement of a serrated surface and a brazed joint.

These advantages and objects should be apparent from reading the specification while viewihg the drawing wherein;

FIG. 1 is a sectional view of a section of the end of a tubular stock of steel;

FIG. 2 is a sectional view of a cylindrical member machined from the tubular stock of FIG. 1;

FIG. 3 is a perspective view of a disc or ring member having a tapered surface and a serrated peripheral surface therein;

FIG. 4 is a sectional view of the cylindrical member of FIG. 2 with the disc member of FIG. 3 positioned on the inside thereof;

FIG. 5 is a section taken through line 5—5 of FIG. 4; and

FIG. 6 is a sectional view of the resulting hub of FIG. 4 with a coaster brake assembly positioned therein.

The method of manufacturing a hub for a coaster brake will now be described in detail.

A length of tubular stock 8 is transported to a work station, such as an automatic screw machine. The tubular stock 8 has an outside diameter 9 and an inside diameter 11 sufficient to allow for some machining of a cylindrical member 10. The inside diameter is machined to define first and second diameters 16 and 17 separated by a shoulder 15. End 14 is established by a set distance from shoulder 15 and a bearing race 20 formed adjacent end 14. Peripheral surface 26 is machined from surface 9 and a groove 24 with a knurled portion formed on end 14. At a fixed linear dimension from end 14, groove 22 with knurls thereon is machined on surface 26 while bearing race 18 is formed on the inside adjacent diameter 17. After the groove 22 is machined and bearing race 18 formed, cylindrical member 10 shown in FIG. 2 is separated from the stock of material 8.

A disc or ring member 30 as shown in FIG. 3 has a knurled surface 32 separated from a shoulder 33 by a groove 35 on its periphery and a smooth tapered surface 34 on its interior. The tapered surface 34 has a frustoconical surface that matches a clutch member in a coaster brake. Disc or ring member 30 is brought to a work station where cylindrical body 10 is held in a fixture 36. Disc member 30 is placed in a fixture 38 and brought into axial alignment with diameter 16 of cylindrical body 10. A length of brazing material 37 is placed in groove 35.

A force is applied to move fixture 38 toward fixture 36. When serrated surface 32 on disc member 30 engages diameter 17 of cylindrical member 10, material 40 may be broached from diameter 17. As shown in FIG. 5, the apexes on the serrated surface 32 cut into the cylindrical member 10 an amount sufficient to establish a mechanical bond to provide for a good joint surface. The force is continually applied to the disc member 30 through fixture 38 until face 42 on shoulder 33 engages shoulder 15.

The cylindrical member 10 with the disc member 30 mechanically attached thereto is removed from this work station and transferred to a work station where sufficient heat is applied to cause the brazing ring 37 to flow into joint 44 and fuse the disc member 30 to the cylindrical member 10 to produce a hub member 50.

The hub member 50 is then transferred to a work station where it is placed in an oven for a predetermined time sufficient to case harden it. This temperature is less than the brazing temperature so that the joint is uneffected during this step. After case hardening, the outer surfaces are plated to complete the development of the hub member 50.

The hub member 50 is then transferred to a work station where the coaster brake 52 is assembled in the following manner.

An axle 54 is threaded for receiving clamping nuts 56 and 58, a bearing cone member 60, and a bearing cone and anchor member 62. A driving member 64 attached to a sprocket 66 is journalled on cone member 60 by ball bearings 70. Drive member 64 has a bearing race 72 for retaining balls 74 which are journalled in race 18 on hub 50. Rings 76 and 78 are attached to the exterior of hub 50 for connecting the hub to a rim (not shown) by spokes. A dust cap 80 which engages a cylindrical surface 83 on hub 50 prevents dust from being communicated to bearings 74.

The hub 50 with axle 54 and drive member 64 located therein is rotated 180° and the clutch and brake assembly portion assembled from the second end 14. The driving member 64 has a screw thread extension 65 which extends into bore 16. A clutch and brake actuating nut 82 is placed on the threaded extension 65. Actuating nut 82 has a frusto-conical clutch surface 84 which is matched with clutch or tapered surface 34 on disc member 30. The opposite end of nut 82 has teeth 86 thereon which engage teeth 88 on brake expander member 90 to prevent rotation of nut 82 during a brake application.

In order to insure traversal of the clutch and actuating nut 82 by rotation of the driving member 64, a retarder or detent sleeve member 92 is located between nut 82 and expander member 90. Nut member 82 has a smooth cylindrical surface 94 and expander 90 has a similar cylindrical surface 96 located thereon which abuts a shoulder 98. The retarder or detent sleeve member 92 has elastic arms 100 and 102 which frictionally engage and move on surfaces 94 and 96 while shoulder 98 limits the movement of expander 90 toward nut 82.

The coaster brake 52 shown in FIG. 6 operates in the following manner: Sprocket 66 rotates the driving member 64 in a clockwise direction in response to an input applied thereto. When sprocket 66 is rotated in a clockwise direction indicated by arrow A, threads 65 move clutch nut 82 toward disc member 30 to bring surface 84 into engagement with surface 34 to lock the driving member 64 to hub member 50. With driving member 64 locked onto hub 50, rotational input in sprocket 66 is imparted to a rim (not shown) through spokes attached to rings 76 and 78.

The mechanical engagement of the serrated section 32 with diameter 17 of the cylindrical body 10, and brazed joint 44 have sufficient strength to assure that the torque applied through driving member 64 is transferred to hub member 50.

Should the input to sprocket 66 cease while a bicycle on which the wheel is attached is moving in a forward direction, nut 82 continues to rotate through its engagement with disc member 30 until it backs away on threads 65 sufficiently to become unlocked therefrom. Thereafter, hub member 50 is free to continue to rotate on bearings 74 and 75 while nut 28 remains stationary.

In order to apply the brakes 104 and 106, driving member 64 is rotated in a counter clockwise direction by an input which causes nut 82 to move toward the second end 14. Rotation of nut 82 is initially resisted by the friction resiliency of the arms 100 and 102 of detent sleeve member 92 but is thereafter locked to expander 90 through the engagement of teeth 86 with teeth 88. When nut 82 engages expander 90 further counter clockwise input force causes the nut 82 to move expander 90 toward anchor member 62. As expander 90 moves toward anchor member 62, brake shoes 104 and 106 move into frictional engagement with the surface of diameter 16 of hub member 10. This frictional engagement is transmitted into the anchor member 62 through the engagement projections 63 and 61 thereon. Since anchor arm 67 is held in a stationary position, the rotative torque of hub member 50 is correspondingly reduced to produce braking.

When a brake application is completed, driving member 64 is rotated in a clockwise direction to move nut 82 toward disc member 30. As nut member 82 moves toward disc member 30, expander 90 is also moved by the frictional coupling of sleeve member 92. Further movement of the nut 82 toward disc member 30 brings surface 84 into contact with tapered surface 34 to lock nut 82 with hub 50 and thereafter transfer the rotation of driving member 64 to the rim of the wheel. As the nut 82 moves away from expander 90, the resiliency of sleeve member 92 assures that the teeth thereon do not remain engaged so as to cause undue wear.

From all the tests performed, the mechanical and brazed joint 44 has sufficient strength to transfer torque from the driving member 64 to the hub member 50.

I claim:

1. A method of manufacturing a hub for retaining a clutch and expandable shoes of a coaster brake, comprising the steps of:
    transportating a supply of tubular material to a work station;
    machining the interior of said tubular material to establish first and second diameters therein separated by a first shoulder;
    cutting a cylindrical member from said tubular material;
    placing said cylindrical member in a first fixture;
    placing a ring member having a peripheral surface with a serrated section separated from a second shoulder by a groove in a second fixture;
    moving said second fixture with respect to said first fixture to align said ring member with said second diameter of said cylindrical member;
    applying a force to said second fixture to bring said serrated section into engagement with said first diameter of the cylindrical member; and
    continuing to move said second fixture toward said first fixture to control the distortion of material from said first diameter by said serrated section until said second shoulder engages said first shoulder and thereby establishes a mechanical joint therebetween.

2. The method, as recited in claim 1, further including the steps of:
    placing a brazing material in said groove on said peripheral surface of said ring member prior to moving said ring member into said second diameter of said cylindrical member.

3. The method, as recited in claim 2 further including the step of:

transporting said cylindrical member with the ring member insert from said first and second fixtures to an oven where the temperature is sufficient to flow the brazing material from said groove into the serrated section and develop a brazed joint with said first diameter to reinforce said mechanical joint sufficient to prevent rotative movement of the ring member with respect to the cylindrical member.

4. The method as recited in claim 3 further including the step of:

forming a tapered section on the interior surface of said ring member, said tapered section being engaged by the clutch to impart rotative torque from a drive member into said cylindrical member.

5. The product produced by the method recited in claim 3.

* * * * *